C. L. JOHNSON.
LOCKING DEVICE.
APPLICATION FILED SEPT. 8, 1919.
1,380,719.
Patented June 7, 1921.
2 SHEETS—SHEET 1.
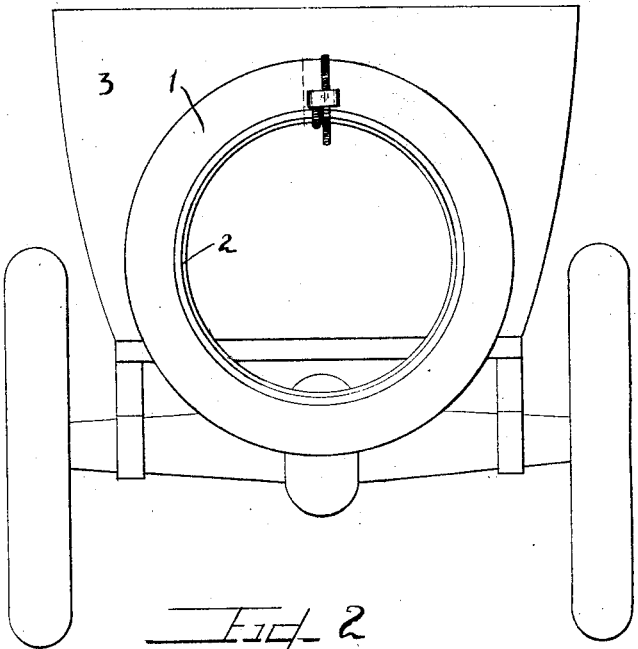
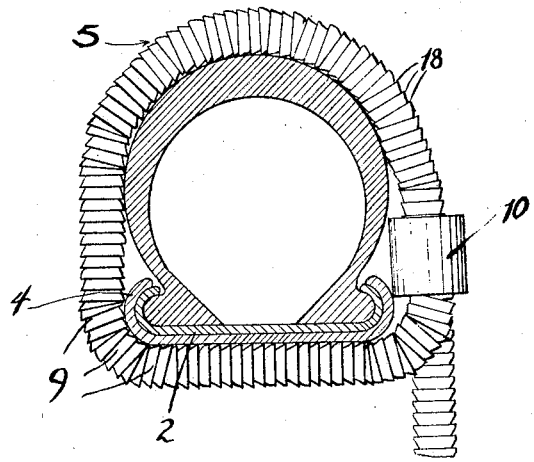
Witnesses
Inventor
Colvin L. Johnson

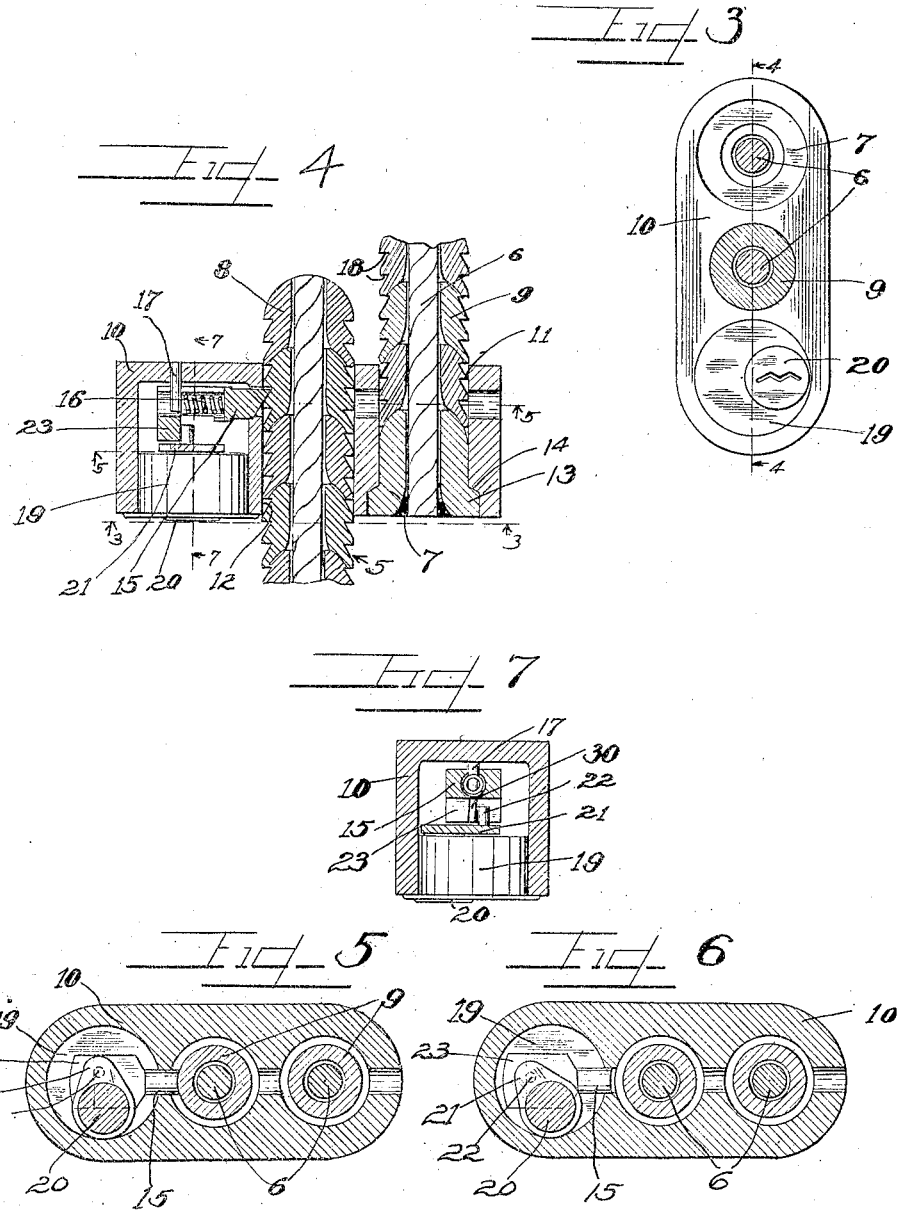

UNITED STATES PATENT OFFICE.

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

LOCKING DEVICE.

1,380,719.     Specification of Letters Patent.     Patented June 7, 1921.

Application filed September 8, 1919. Serial No. 322,438.

*To all whom it may concern:*

Be it known that I, COLVIN L. JOHNSON, a citizen of the United States, and a resident of the city of Chicago, in the county of Cook and State of Illinois, have invented certain new and useful Improvements in a Locking Device; and I do hereby declare that the following is a full, clear, and exact description of the same, reference being had to the accompanying drawings, and to the numerals of reference marked thereon, which form a part of this specification.

This invention relates to locking devices, and although not restricted to such use, is particularly adapted for securing spare tires to automobiles, and other purposes where a padlock and chain is used, at the present time.

Automobile tire locks as heretofore constructed do not grip the tire firmly, or if they will grip a tire of one size they will not go around a tire of larger size, and smaller sized tires are not held firmly thereby.

A further disadvantage of the previous forms of tire locks is that they have been constructed of relatively soft material, so that they could be cut through by a file or other cutting tools.

A further disadvantage of previous forms of construction is that they have been of relatively narrow width so that they tend to cut the tread of the tire.

Further, previous forms of tire locks have not been adapted for use with either single or double tire carriers.

It is an object, therefore, of the present invention to provide a tire lock which may be adjusted to grip firmly a tire of any size.

It is also an object of the invention to provide a tire lock which, although flexible, may be formed with hardened steel surface so that it cannot be cut through by means of a file, hack saw or similar tool.

A further object of the invention is to provide a tire lock which will grip and lock a pair of tires as well as a single tire.

An additional object of the invention is to provide a tire lock which may be applied without the use of tools or keys of any kind, a key being required only when it is desired to detach the tire from its support.

Other and further important objects of this invention will be apparent from the disclosures in the drawings and specification.

The invention (in a preferred form) is illustrated in the drawings and hereinafter more fully described.

On the drawings:

Figure 1 is an end view of an automobile having a tire lock applied thereto embodying the features of the present invention.

Fig. 2 is a section on the line 2—2 of Fig. 1.

Fig. 3 is a section on the line 3—3 of Fig. 4.

Fig. 4 is a section on the line 4—4 of Fig. 3.

Fig. 5 is a section on the line 5—5 of Fig. 4.

Fig. 6 is a view similar to Fig. 5 showing the parts in a different operative position.

Fig. 7 is a section on the line 7—7 of Fig. 4.

As shown on the drawings:

A tire 1, is shown mounted on a tire support 2, secured to the rear end of an automobile 3 in any convenient way. The support 2, as shown, consists of a ring having an upwardly extending curved flange 4, against which one bead of the tire or tire rim may rest. Ordinarily the tire may slide freely on and off of the support so that locking means of some kind are required to retain it in place. The tire lock shown comprises an armored cable generally designated as 5, adapted to have its ends detachably secured to a block 10.

The construction of the armored cable is shown more particularly in Fig. 4. This armored cable is formed of stranded cable or rope 6, preferably of steel or other flexible wire, having terminals 7 and 8, usually of steel, attached to its ends. A very satisfactory form of construction is provided by welding the cable 6 to the terminals 7 and 8, and then case-hardening the whole so that the cable as well as the terminals are made sufficiently hard to resist cutting or drilling. Intermediate the terminals 7 and 8 are arranged a series of rings 9, provided with spherical engaging surfaces so that each ring may rock or rotate on the adjacent ring in order that the cable as a whole may be flexed so as to conform to the curvature of the tire. Preferably the rings are formed of hardened steel so that they cannot be cut through by a file or other similar tool.

In the block 10 apertures 11 and 12 are provided for the passage of the armored cable therethrough. One terminal of the cable, as 7, however, is provided with an enlarged head 13 so that the cable may not be drawn completely through the aperture in the block. Preferably a recess 14 is formed in the block for the reception of this head 13. The other end of the cable may be passed freely into and out of the aperture 12, except when retained therein by suitable locking means.

In order that the cable may be releasably locked in the aperture 12, a pawl or locking member 15 is provided within the block 10. Normally this pawl 15 is pressed inwardly so as to engage the cable 5 by means of a spring 16 bearing at its rear against a pin 17. The beveled end of this pawl 15 is adapted to engage the shoulder at the end of each ring 9, and in order to enable the position of the cable to be adjusted more closely than the length of one ring, intermediate shoulders 18 are provided on each of the rings 9. These shoulders 18 are substantially perpendicular to the cable and engage the perpendicular face of the pawl 15 so that the latter cannot be pressed rearwardly by tension in the cable 5 tending to draw the latter out of the aperture 12. If, however, the cable is pulled in the opposite direction to tighten the grip of the armored cable upon a tire, the inclined rear surface of the shoulders 18 and the rounded ends of the rings engaging the beveled surface at the end of the pawl 15 forces the latter back so that it may be brought into engagement with one or other of the preceding shoulders. Preferably the pawl is arranged as shown with its inclined surface as far from the corresponding side of the block 10 as possible to increase the difficulty of inserting a jimmy, knife blade or other instrument along the surface of the cable 5 to contact with the inclined end of the pawl and cause its retraction.

In order that the pawl 15 may be retracted when desired, suitable key-operated devices may be employed. One of the most convenient devices for this purpose is a cylinder or pin lock 19, provided with a rotating cylinder 20 adapted to be turned by means of a key in well-known manner. To the inner end of this cylinder 20 is attached a plate 21, carrying a pin 22 at its outer end. This pin 22 is adapted to engage a lug 23 on the rear end of the pawl, when the cylinder 20 is rotated so that the pawl is retracted, as indicated in Fig. 6. When the pawl has been retracted in this way, the cable may be pulled out of the aperture 12 and the locking device removed from the tire. A recess 30 in the lug 23 is provided for releasably holding the pin 22 when the lock has been operated.

The operation is as follows:

After the tire has been placed upon its support, the armored cable 5 is passed through the aperture 11 so as to bring its enlarged head 13 into engagement with the recess 14. The cable 5 is then passed around the tire and its support as shown in Fig. 2, and its free end passed through the aperture 12 in the block 10. The end of the cable 5 is then gripped and pulled through the block until the cable grips the tire sufficiently firmly. During this tightening movement the pawl 15 slides over the shoulders 18 and the ends of the rings. When it is desired to remove the tire, a key is inserted in the lock to rotate the cylinder. This rotation of the cylinder causes the pin 22 connected therewith to bear against the lug 23 on the pawl 15 and thereby retract the latter against the tension of its spring 16. When this has been accomplished, the cable may be withdraw from the aperture 12 and the locking device removed from the tire.

I am aware that numerous details of construction may be varied through a wide range without departing from the principles of this invention, and I therefore do not purpose limiting the patent granted otherwise than necessitated by the prior art.

I claim as my invention:

1. A locking device comprising a block, an armored cable including a cable and a series of rings therearound, means for connecting one end of the armored cable to the block, said block having an aperture therein for the passage of the other end of the armored cable therethrough and a locking member adapted releasably to engage a shoulder on one or other of the rings to retain the cable in position in said aperture.

2. A locking device comprising a block, an armored cable including a cable and a series of rings therearound, means for connecting one end of the armored cable to the block, said rings having annular projections thereon each projection having the face nearest said end substantially perpendicular to the cable to form a shoulder and the other face inclined thereto, said block having an aperture therein for the passage of the other end of the armored cable therethrough and a spring pressed pawl adapted to engage one or other of said shoulders and prevent retraction of the cable from said aperture while allowing the cable to be inserted therein.

3. An automobile spare tire lock, comprising a block having apertures therein, a flexible member with one end secured in one of said apertures while the other end passes through the second aperture, a flexible armor covering of hardened metal completely inclosing said member, and a locking mechanism completely inclosed in said block and adapted to engage and lock with said armor covering.

4. An automobile spare tire lock, comprising an apertured block, flexible means having one end secured in said block and the other end slidable through the aperture in said block, said flexible means embracing a member completely inclosed by a sectional armor covering of hardened metal, and locking means in said block for engaging the armor covering to hold the flexible means locked against retraction from said block.

In testimony whereof I have hereunto subscribed my name in the presence of two subscribing witnesses.

COLVIN L. JOHNSON.

Witnesses:
LE ROY D. KILEY,
EARL M. HARDINE.